(12) United States Patent
Chang et al.

(10) Patent No.: US 8,938,705 B1
(45) Date of Patent: Jan. 20, 2015

(54) SYSTEMS AND METHODS FOR PARTIAL RETENTION SYNTHESIS

(71) Applicant: Avery Design Systems, Inc., Andover, MA (US)

(72) Inventors: Kai-Hui Chang, North Andover, MA (US); Yen-Ting Liu, Kaohsiung (TW); Christopher S. Browy, Boston, MA (US); Chi-Lai Huang, Andover, MA (US)

(73) Assignee: Avery Design Systems, Inc., Tewksbury, MA (US)

( * ) Notice: Subject to any disclaimer, the term of this patent is extended or adjusted under 35 U.S.C. 154(b) by 0 days.

(21) Appl. No.: 14/292,933

(22) Filed: Jun. 1, 2014

Related U.S. Application Data

(60) Provisional application No. 61/844,979, filed on Jul. 11, 2013, provisional application No. 61/908,233, filed on Nov. 25, 2013.

(51) Int. Cl.
 *G06F 17/50* (2006.01)
(52) U.S. Cl.
 CPC ........ *G06F 17/5068* (2013.01); *G06F 17/5009* (2013.01)
 USPC .......................................................... 716/133

(58) Field of Classification Search
 CPC .................................. G06F 17/30; G06F 17/50
 USPC .......................................................... 716/133
 See application file for complete search history.

(56) References Cited

U.S. PATENT DOCUMENTS

| | | | |
|---|---|---|---|
| 2008/0208559 A1* | 8/2008 | Koelbl et al. | 703/16 |
| 2008/0235253 A1* | 9/2008 | Koelbl et al. | 707/100 |
| 2008/0301602 A1* | 12/2008 | Koelbl et al. | 716/5 |

* cited by examiner

*Primary Examiner* — Vuthe Siek
*Assistant Examiner* — Mohammed Alam
(74) *Attorney, Agent, or Firm* — Loginov & Associates, PLLC; William A. Loginov

(57) ABSTRACT

A retention synthesis application provides a means of analyzing a circuit design, functional test sequences, and the associated power specification to identify registers that do not need retention when a block is powered down. Reducing the number of retention registers reduces power consumption and chip area. The retention synthesis application is based, at least in part, upon symbolic simulation. In symbolic simulation, a symbol is used to represent a value that can be either 0 or 1 and the propagation of symbols is traced through the simulation.

11 Claims, 10 Drawing Sheets

SYSTEMS AND METHODS FOR PARTIAL RETENTION SYNTHESIS

RELATED APPLICATIONS

This application claims the benefit of U.S. Provisional Application Ser. No. 61/844,979, filed Jul. 11, 2013, entitled METHODS FOR AUTOMATICALLY SELECTING REGISTERS FOR PARTIAL STATE RETENTION, the entire disclosure of which is herein incorporated by reference. This application also claims the benefit of U.S. Provisional Application Ser. No. 61/908,233, filed Nov. 25, 2013, entitled METHODS FOR PARTIAL RETENTION SYNTHESIS, the entire disclosure of which is also herein incorporated by reference.

FIELD OF THE INVENTION

The present invention relates generally to integrated circuit design and, more particularly, to techniques for determining non-retention and retention registers.

BACKGROUND OF THE INVENTION

In integrated circuit design, it is desirable to minimize the power that is used by maximizing efficiency of a chip. One way to do this is to minimize the number of registers that are "retention" registers (meaning, they retain data when no power is applied to the register), and thereby maximize the number of "non-retention" registers (meaning, registers that do not retain their data unless power is provided).

In the mobile electronics area where battery-driven devices are ubiquitous, power consumption has become one of the major concerns when designing circuits. To reduce power consumption, one commonly-used technique is to turn off power to the blocks within a chip that are not being used. For example, when a mobile phone is in idle mode, its FM receiver circuitry for listening to radios can be turned off. By turning off power to unused blocks, power consumption can be reduced considerably. To support such design needs, power specification languages like Unified Power Format (UPF) have been proposed to describe power intention when designing a chip.

One major problem with this power-off approach is that information in power-down blocks will be completely lost. When the block is needed again, it will be in a non-deterministic state, producing unpredictable circuit behavior. To address this problem, retention registers can be used. A retention register is a special type of register that can retain its value when the block is powered down. This is typically achieved by drawing power from an alternate power source that is still on when the block is powered down.

To verify that the power-down block will operate correctly after power-up, full retention can be implemented. In full retention, the value of every single register in the block is retained. In this manner, all of the information in the block is preserved during power-down and can be fully restored after power-up. However, this design implementation may not be optimal because some registers do not need retention if their values are updated before the registers are first read after power-up. Since retention registers draw more power and have a larger area, it is desirable to retain only a subset of all registers. This is called partial retention.

It is possible to manually inspect a design to select registers that do not need retention, however that is time-consuming and tremendously error-prone.

SUMMARY OF THE INVENTION

The systems and methods herein analyze a circuit design, functional test sequences and the associated power specification to identify the status of registers during a simulation sequence. The systems and methods herein identify registers that do not need retention ("non-retention registers"), and registers that do need retention ("retention registers"). Reducing the number of retention registers allows for the circuits to be produced more cost-effectively.

A method for identifying retention status of one or more registers on a chip during simulation comprises the steps of (a) verifying that one or more registers has not required retention in any prior interval and is still a non-retention candidate; (b) determining if the register is over-written at a check-point, and if (i) yes the register is over-written at the check-point and requires retention for the analyzed interval, then the register requires retention, and if (ii) yes the register is over-written at the checkpoint and does not require retention for the analyzed interval, then the register does not require retention and if (iii) no the register is not over-written at the check-point, the register can still be a non-retention candidate and; and (c) determining a retention status of the register at the final state to identify registers that require retention and registers that can be non-retention

BRIEF DESCRIPTION OF THE DRAWINGS

The invention description below refers to the accompanying drawings, of which.

DETAILED DESCRIPTION

The systems and methods shown and described herein analyze a circuit design, functional test sequences and the associated power specification to identify registers that do not need retention ("non-retention registers") and/or registers that do need retention ("retention registers") when a block (of the chip) is powered down. Reducing the number of retention registers reduces power consumption and overall chip area, producing circuits that are less expensive and more efficient. Generally, retention registers require power and are more expensive than non-retention registers. Thus, it is desirable to increase the number of non-retention registers and reduce the number of retention registers.

The systems, methods and procedures herein are based, at least in part, upon symbolic simulation. In symbolic simulation, a symbol is used to represent a value that can be either "0" or "1", while an ordinary scalar value can only be one of the two possible values. Symbolic simulation then propagates the symbols through design constructs to generate symbolic traces for each design variable. For example, if design code says "a=b OR c", symbolic simulation creates "b OR c" at "a" instead of assigning 0 or 1 to "a" based on the value of "b OR c". A symbol can be either 1-bit or multi-bit. For an n-bit symbol, 2" values can be represented.

Figure 1:
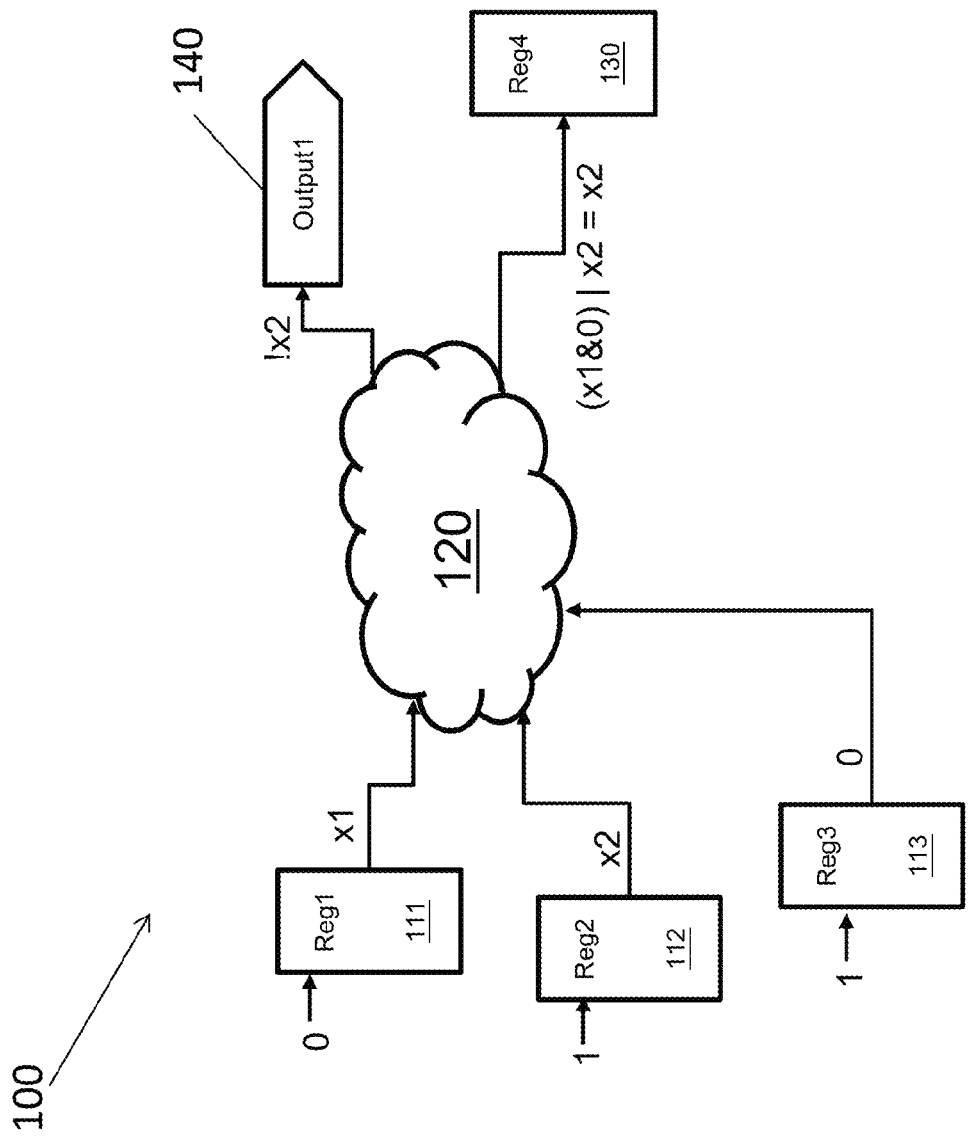
FIG. 1 is an overview system diagram of an exemplary design showing retention synthesis, according to an embodiment.

Reference is now made to FIG. 1, showing an example of a system 100 in which retention synthesis occurs or is needed, in accordance with an exemplary embodiment. As shown, there are three registers Reg1 111, Reg2 112 and Reg3 113 which each receive an input that can be 0 or 1. The input for Reg1 111 is 0, and the input for Reg2 112 and Reg3 113 is 1. The value in the registers 111, 112 and 113 are input to processing cloud 120. The processing cloud 120 is typically combinational Boolean logic operations but can comprise a processor, network, or other means by which the data in a register is processed, analyzed, and flows through a circuit or specification. The "X" in FIG. 1 represents the value in a non-retained register, which can be either 0 or 1. The X in Reg1 111, denoted as x1, will be masked by downstream logic and, thus, will not affect design operation. Therefore, Reg1 111 does not need retention. The X in Reg2 112, denoted as x2, will not be masked by downstream logic and, thus, does need retention. The register reg4 130 requires the value that is contained in reg2 112 after the processing occurs. The output1 140 also uses the value contained in reg2 112 and, as such Reg2 112 requires retention.

Overall System and Method

Figure 2:
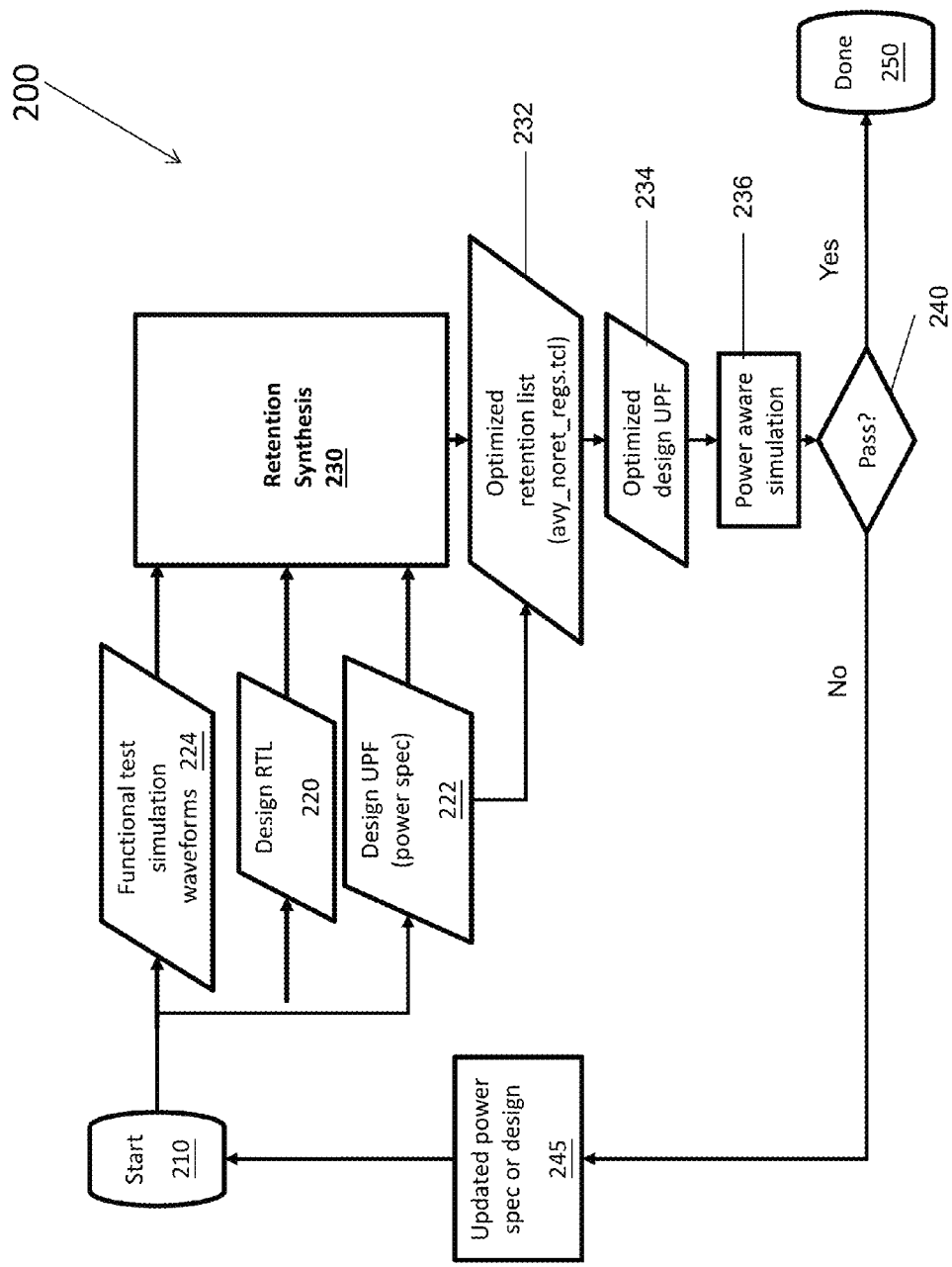
FIG. 2 is a flow diagram of a procedure for automatically selecting registers for retention, according to an embodiment.

Retention synthesis, as used generally herein, refers to the systems and methods that select registers that do not need retention. Reference is made to FIG. 2 showing a flow chart of a procedure 200 automatically selecting registers for retention, according to an embodiment. The procedure commences at the start 210 and given a design 220, its associated power specification (Unified Power Format UPF) 222 and functional test sequences 224 (typically waveforms), the retention synthesis module 230 produces a suggested list 232 containing registers that do not need retention. This list can be used as part of the overall power specification for the design. The retention synthesis module 230, or more generally "retention synthesis" as used herein, refers to the means by which the retention status of a register is determined, including but not limited to a computer executable tool, an application running on a server or computing environment, a hardware- or software-based system, or combination thereof. For example a UPF 234 can be produced that is based on extracting a full register list without the non-retention registers. This provides designers with a list of registers requiring retention, or (if desired) a list of registers that are non-retention. Power aware simulation 236 is then performed to verify the correctness of the retention. If all of the tests pass at step 240, then the analysis is done at 250. Otherwise, the designer updates the power specification or the design at 245 to correct or fix the errors, and the procedure is performed again by commencing at step 210.

The steps of this procedure and the other procedures shown and described herein are carried out by a processor configured to perform the steps, or distributed over a series of processor in accordance with ordinary skill. The module as described herein can be any appropriate computing system architecture or software or hardware, or combination thereof, that is configured to perform the procedures herein for identifying non-retention registers and retention registers. It should also be clear that although the blocks are depicted in a particular arrangement and occurring in a particular order, this can be performed in a different order than as set forth in the figure, or that additional blocks can be added or removed.

Identifying Non-Retention Registers

In the retention synthesis module, the given functional test sequences are analyzed to identify registers that, when made non-retention, do not affect any primary outputs or any final stages. Meaning, essentially, their effects are not visible. The initial set of non-retention candidates can be given by the user or set to a default value. Typically, all clocked registers can be set as non-retention candidates.

An input functional test sequence can be any sequence that is legal. By legal, it is intended to refer to a sequence comprising a series of input stimuli that can happen in real-world applications. Conversely, an "illegal" sequence is a series of input stimuli that will never realistically occur in the environment where the circuit is used. The sequence desirably exercises as many registers as possible within the block of the chip so that the status of the registers can be determined more accurately. Typically, at least one power-up sequence is analyzed in order to exercise power-related registers.

Figure 3:
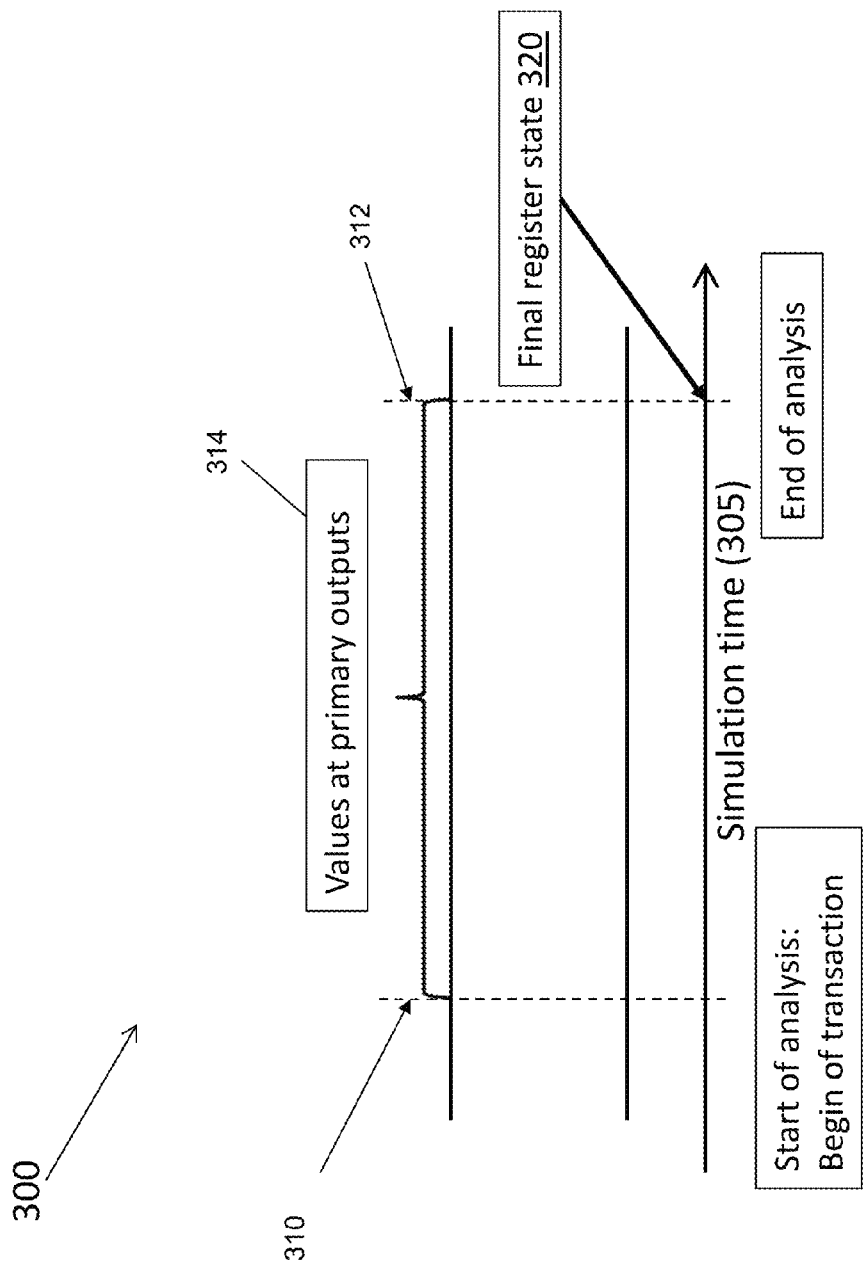
FIG. 3 is a high-level overview graphical diagram for selecting non-retention registers in a simulation sequence, according to an embodiment.

FIG. 3 is a high-level overview graphical diagram of the overall procedure for selecting non-retention registers in a simulation sequence, according to an embodiment showing the simulation sequence as a function of simulation time. The procedure commences with a given functional test sequence assuming full retention. One of many desired outcomes is to start at the beginning of the transaction 310 and monitor the values at primary outputs 314 over the simulation time 305, and monitor the final register state 320 at the end of the analysis 312, and identify registers that do not need retention while the primary outputs 314 and final register state 320 remain the same. Meaning, after making a selected register non-retention, there is no observable difference in the output of the register, and thus the selected register is capable of being non-retention.

Figure 4:
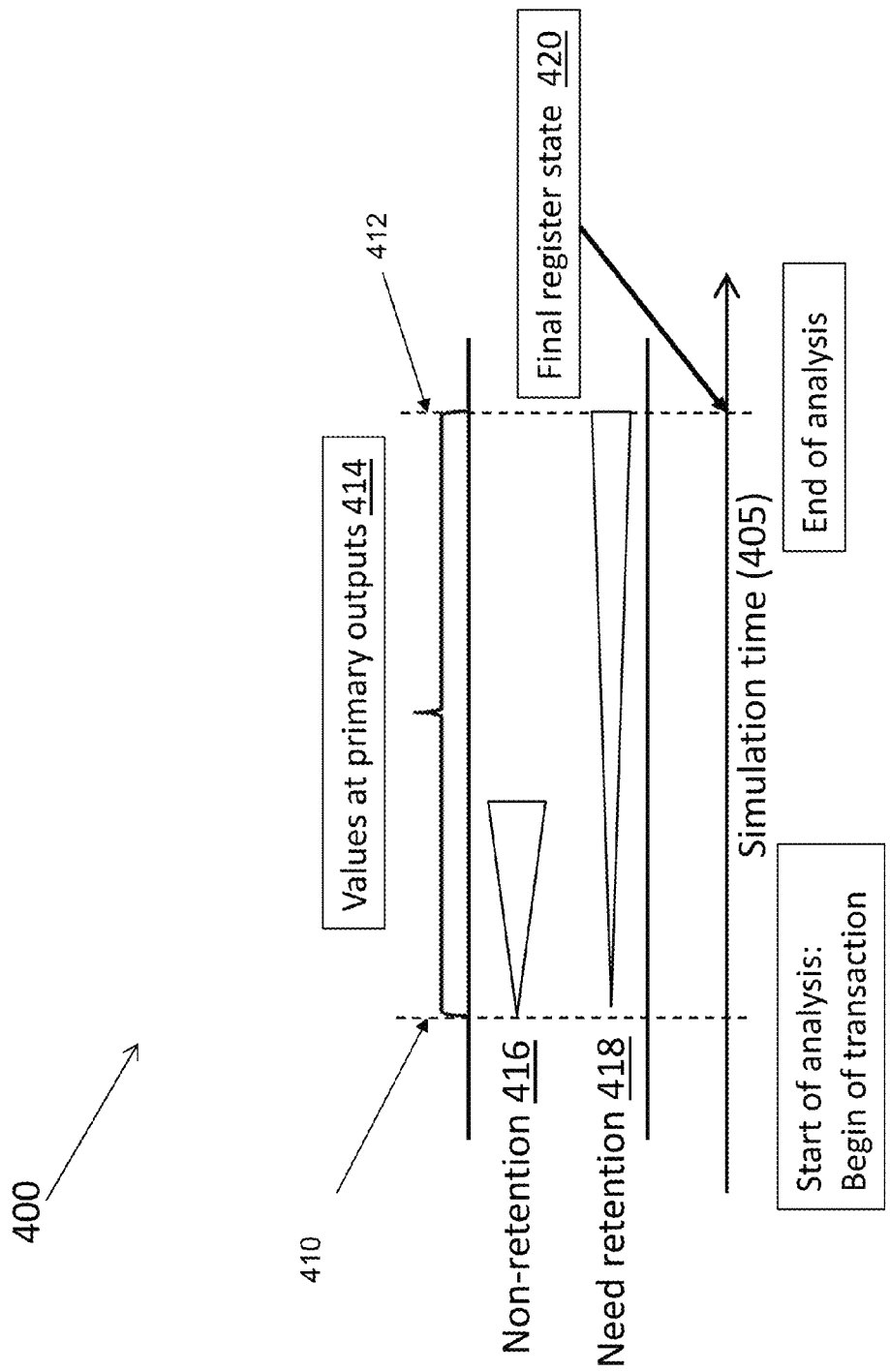
FIG. 4 is a high-level overview graphical diagram for making a register as non-retention, according to an embodiment.

To find registers that do not need retention while ensuring the primary outputs and final state remain the same, with reference to FIG. 4, the procedure makes a register non-retention 416 and evaluates its effect. FIG. 4 is a high-level overview graphical diagram for making a register as non-retention, according to an embodiment. If the primary 414 and the final state 420 remain the same, then the register is marked as non-retention 416. Otherwise, the change is discarded as it requires retention 418. The result of performing the retention synthesis is shown in FIG. 5.

Figure 5:
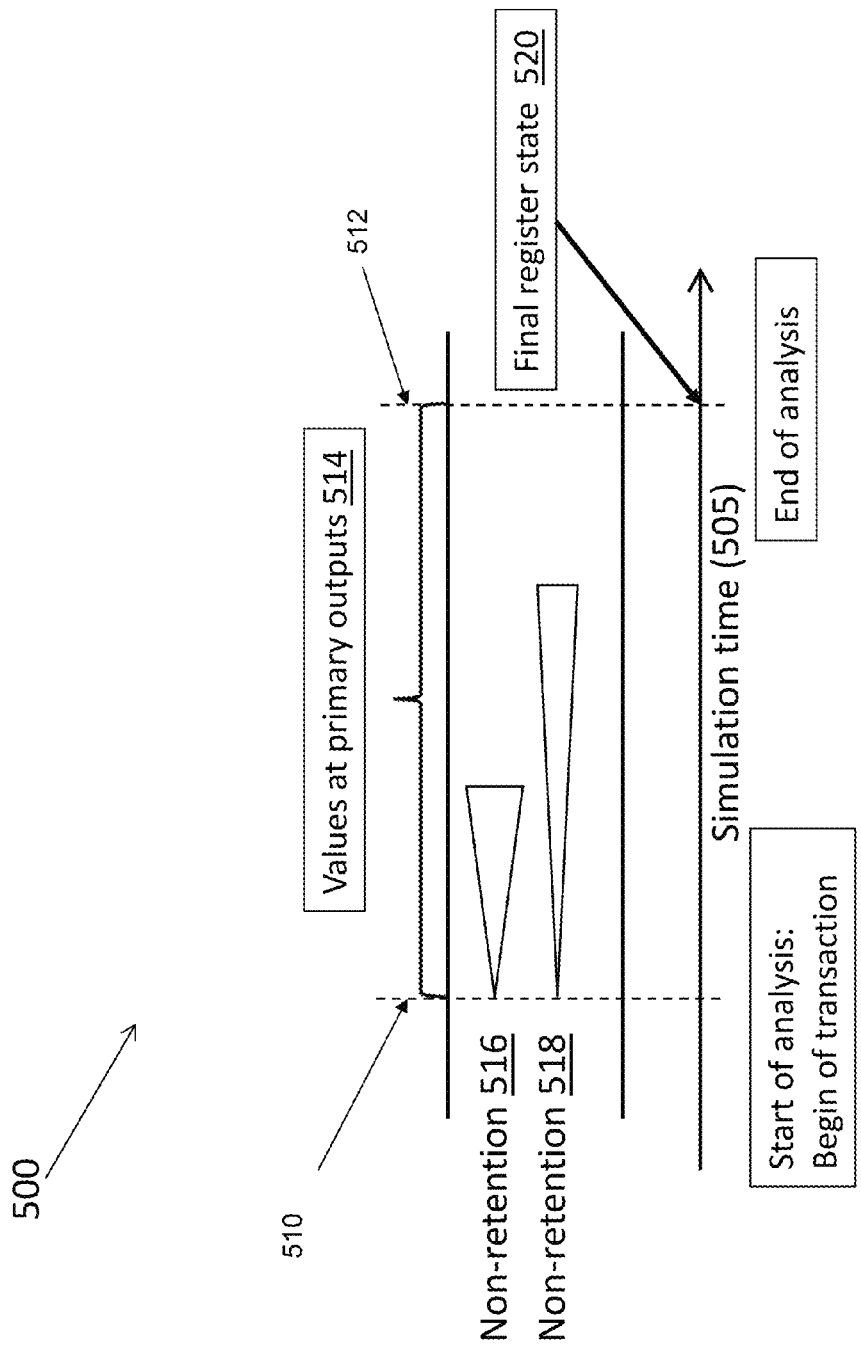
FIG. 5 is a high-level overview graphical diagram showing the effects of non-retention registers in a simulation sequence, according to an embodiment.

FIG. 5 is a high-level overview graphical diagram showing the effects of non-retention registers in a simulation sequence, according to an embodiment. The graphical diagram 500 shows the simulation time 505 and the start of the analysis 510, which is the beginning of the simulation sequence, and the end of the analysis at 512. The values at primary outputs 514 and final register state 520 are analyzed to determine non-retention register 516 and non-retention register 518. After retention synthesis, the identified non-retention registers have been proven not to affect design operation for the given simulation sequence.

Detailed Implementation of Retention Synthesis

Figure 6:
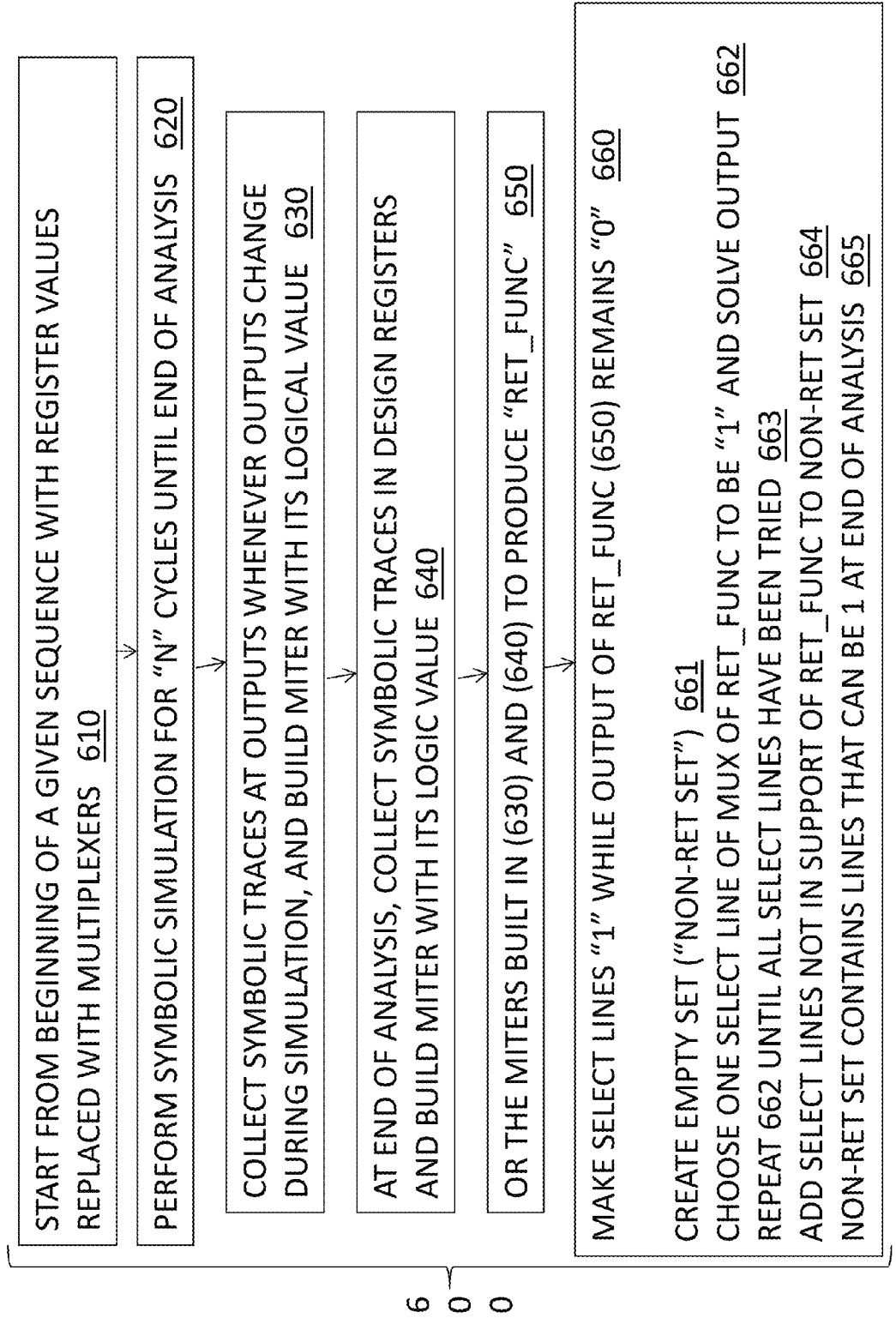
FIG. 6 is a flow chart of a procedure for identifying registers capable of being non-retention in a simulation sequence, according to an embodiment.

Reference is now made to FIG. 6 showing a flow chart of a procedure for identifying registers capable of being non-retention in a simulation sequence, according to an embodiment. The procedure commences at block 610 and starts from the beginning of a transaction in the functional test sequence where the states of registers are known. The register values are replaced with multiplexers (MUXes). One data line connects to the original value, and the other connects to a new symbol, as described in greater detail herein.

At step 620, symbolic simulation is performed for "N" cycles, and the termination of "N" is described in greater detail below. When the value in a selected register is first accessed, its symbolic trace is replaced from the scalar value that the register possesses to a multiplexer (MUX). The MUX is configured so that when the select line of the MUX is 0, the original scalar value is selected, and when the select line is 1, a new symbol is selected. Two new symbols can be introduced in this configuration. The MUX gives the symbolic trace the ability to become non-retention. If the select is 1, the new symbol will be selected and the register can have any value as if it is not retained. The impact of the register (through is representation as a MUX) on the overall design operation can thus be determined by rendering the MUX (and its associated register) retention or non-retention and analyzing its affect on the overall design, or partitioned portion thereof in accordance with the embodiments herein.

During symbolic simulation, at step 630, whenever the outputs change in the design, the symbolic traces at the outputs are collected and a miter (XOR) is built with its logic simulation value. The XOR miter outputs a 0 when the inputs are the same, but a 1 when the inputs vary.

At the end of cycle N, the symbolic trace in each design register is collected and a miter is built with its logic simulation value at step 640.

At step 650, then the miters generated in step 630 and 640 are ORed to produce a Boolean function. This function can be named, for example, "RET_FUNC". If the output of the Boolean function is 0, then the design behavior is the same as the one with full retention. If the output of the Boolean function is 1, then the design behavior is different. Meaning, either the outputs changed during the simulation sequence or the final state has changed.

In accordance with the embodiments herein, N can be any number that is as large as possible, while symbolic simulation and formal solving can be efficiently performed. In practice, this number is often determined empirically by analyzing the retention synthesis procedure runtime.

Next, at step 660, given the Boolean function generated in step 650, it is desired that as many select lines as possible have the value of 1 while making sure the output is 0. An output of 1 undesirably means that the design behavior has changed (and, thus the register requires retention). A register who has a MUX select equal to 1 means that the register does not need retention because its symbol will not affect design operation. The detailed procedure of steps 661-665 identifies the MUXes whose select lines can be 1 while the output of the function (for example, "RET_FUNC") remains 0. At step 661, create an empty set, for example "NON-RET SET". At step 662, choose one select line of the MUX of the RET_FUNC to be 1 and set all other select lines (except those in NON-RET SET) to 0. Use a formal solver to check if the output of the function can be 1 or not. If not (if the output is always 0), add the select line to the NON-RET SET.

At step 663, step 662 is repeated until all select lines have been tried or a given abort condition is satisfied. An abort condition can be runtime or the number of tried select lines, or any other condition or timeout function within ordinary skill.

At step 664, the select lines that are not in support of the function (for example, "RET_FUNC") are added into the NON-RET SET. The corresponding MUXes are eliminated during symbolic simulation and are guaranteed to not affect design operation, so they do not need to be retained.

At step 665, at the end of the analysis, NON-RET SET contains a list of select lines that can be 1, and the corresponding registers do not need retention. The procedure of FIG. 6 can be implemented using incremental SAT (propositional satisfiability) solver or unsatisfiable core extraction for shorter runtime. Alternatively, any Boolean function analysis methods such as BDD (Binary Decision Diagrams) or ATPG (Automatic Test Pattern Generation) can be used.

For a register whose value has not been over-written during the analyzed sequence, it can never be in the list NON-RET SET because its symbol will always affect itself. If the symbol does not affect any other register either, then most likely the register is not exercised at all by the analyzed sequence. In this case, the retention status of the register is considered "inconclusive" because it cannot reliably be determined whether the symbol in the register will affect any other register or the final state in the future. In this case, a test sequence that exercises the register needs to be analyzed for the algorithm to determine the retention status of the register.

More specifically, a register has an "inconclusive" status if it has not been over-written during the analyzed sequence and if its symbol does not affect any register other than itself. After analyzing a sequence, a register can have one of the following three possible statuses: require retention, non-retention and inconclusive.

It is noted that changing the order on which select line is tried first can affect the results of the analysis. It is possible to randomize the order to produce different results and then select the best one. Alternatively, design logic can be analyzed to determine which registers to try first. For example, registers with more bits can be tried first, and a register that dominates the fan-in cone of multiple down-stream registers is desirably tried later so that more registers can become non-retention.

If Xs (unknowns) exist in the initial state of the analyzed sequence, they are replaced with symbols so that their effects can be fully evaluated during symbolic simulation. If Xs exist at primary outputs or the final state, they are ignored. The Xs at primary outputs or the final state can be ignored because they do not matter even will full retention, and thus their values will not matter with partial retention.

The retention synthesis is a tool used by designers to determine which registers do not need retention. Designers can also simulate different sequences to determine how they affect retention.

Scalability Improvements

If scalability becomes an issue as chips grow in size and complexity, a flow based on partitioning the design and analyzing each partitioned block separately can be used. In addition, temporal partitioning can be used. Temporal partitioning cuts a long sequence into shorter intervals and analyzes each interval separately. In this manner, the complexity of symbolic simulation and the generated Boolean function can be reduced, thus improving runtime and memory usage.

Figure 7:
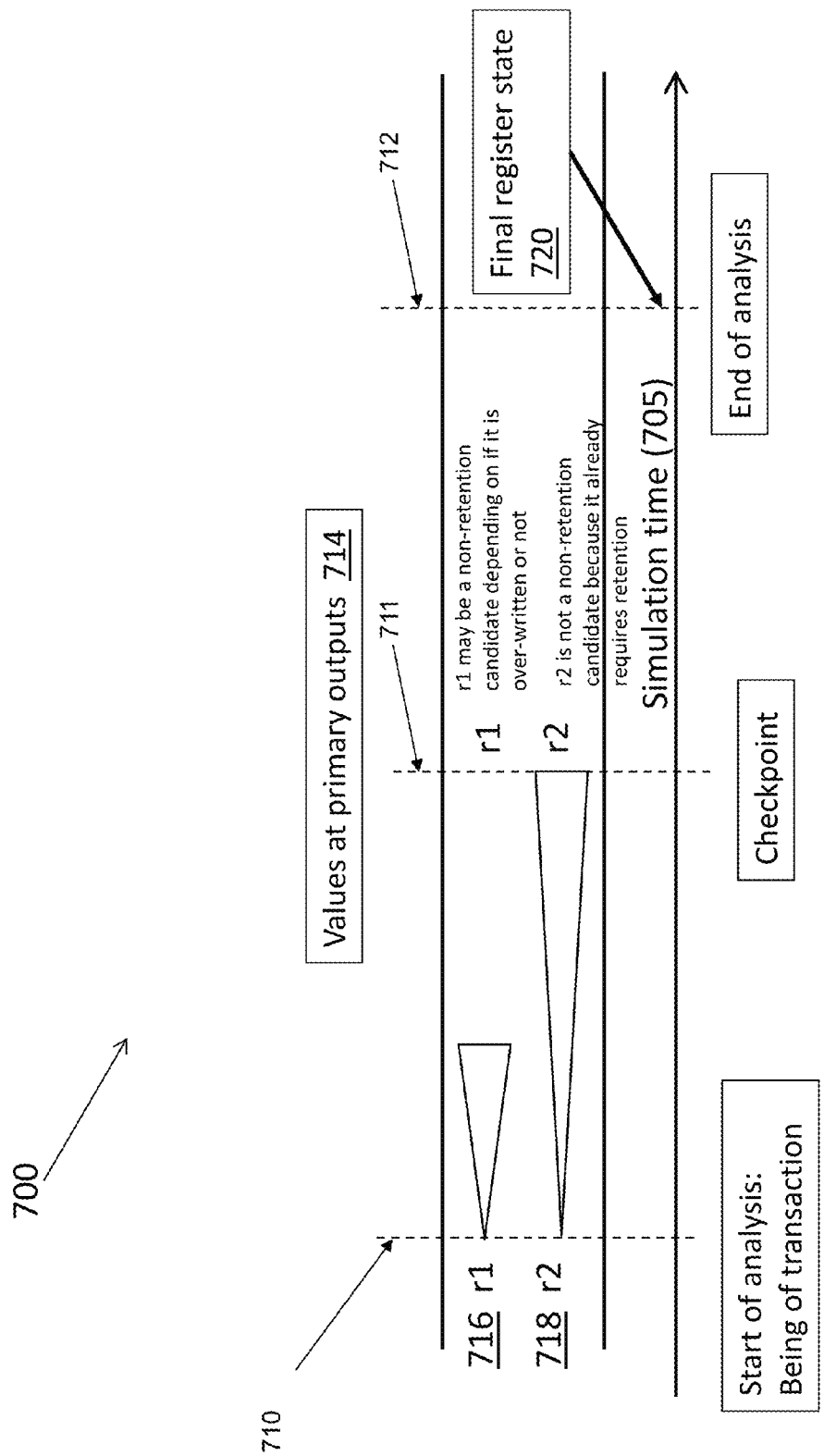
FIG. 7 is an overview graphical diagram showing how non-retention candidates are determined in a simulation sequence, according to an embodiment.

Temporal partitioning works as follows, and with reference to FIGS. 7-9. First, at the end of the interval, retention synthesis is performed using the methods herein relating to "identifying non-retention registers" and then all registers are verified that are non-retention candidates. If a register has an "inconclusive" status, it is marked as a non-retention candidate for the next interval. FIG. 7 shows an example and FIG. 8 shows the flow chart to determine non-retention candidates at a checkpoint for the next analysis interval.

FIG. 7 is an overview graphical diagram showing how non-retention candidates are determined in a simulation sequence, according to an embodiment. As shown in FIG. 7, the simulation time 705 spans from the start of analysis 710 at the beginning of the transaction, and has a check-point 711 and the end of the analysis at 712 is the final register state 720. The values at primary outputs 714 are also checked. The register r1 (716) may be a non-retention candidate depending on if it is over-written or not. The register r2 (718) is not a non-retention candidate because it already requires retention at checkpoint 711.

Figure 8:
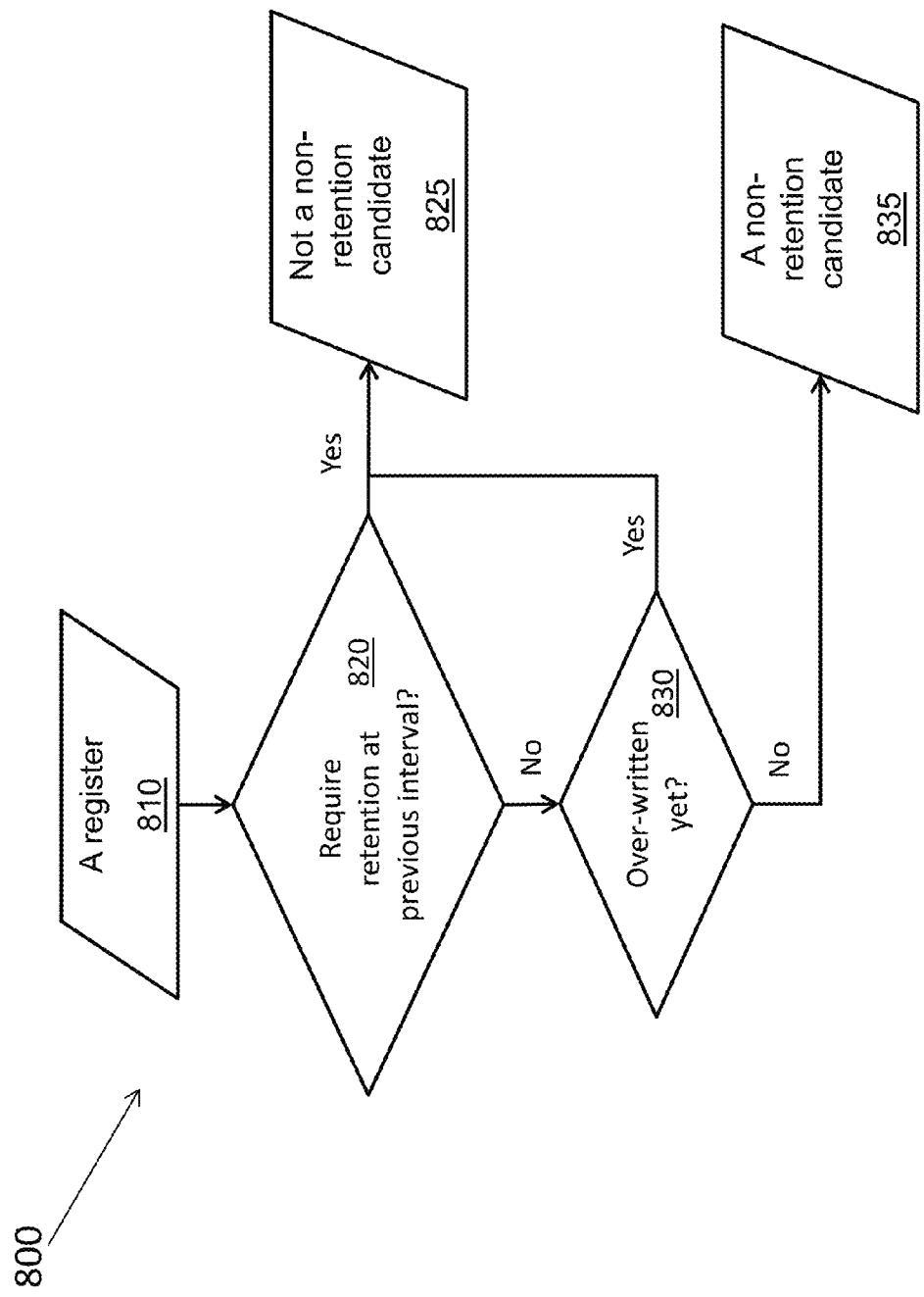
FIG. 8 is a flow chart of a procedure for determining non-retention candidates at a checkpoint of a simulation sequence, according to an embodiment.

FIG. 8 is a flow chart of a procedure for determining non-retention candidates at a checkpoint of a simulation sequence, according to an embodiment. The procedure 800 commences with a register at 810. At step 820, it determines whether the register required retention at a previous interval. If it does, then it is not a non-retention candidate 825, meaning it is a retention register. If it does not require retention at a previous interval at step 820, it determines whether the register has been over-written yet at 830. If it has been over-written, then it is not a non-retention candidate 825, and it is a non-retention register. If it is not over-written yet at 830, then it is a non-retention candidate 835 for the next interval.

Second in temporal partitioning, at the start of an interval, for registers that are still marked as non-retention candidates, replace scalar values for registers with MUXes, and then continue symbolic simulation.

Figure 9:
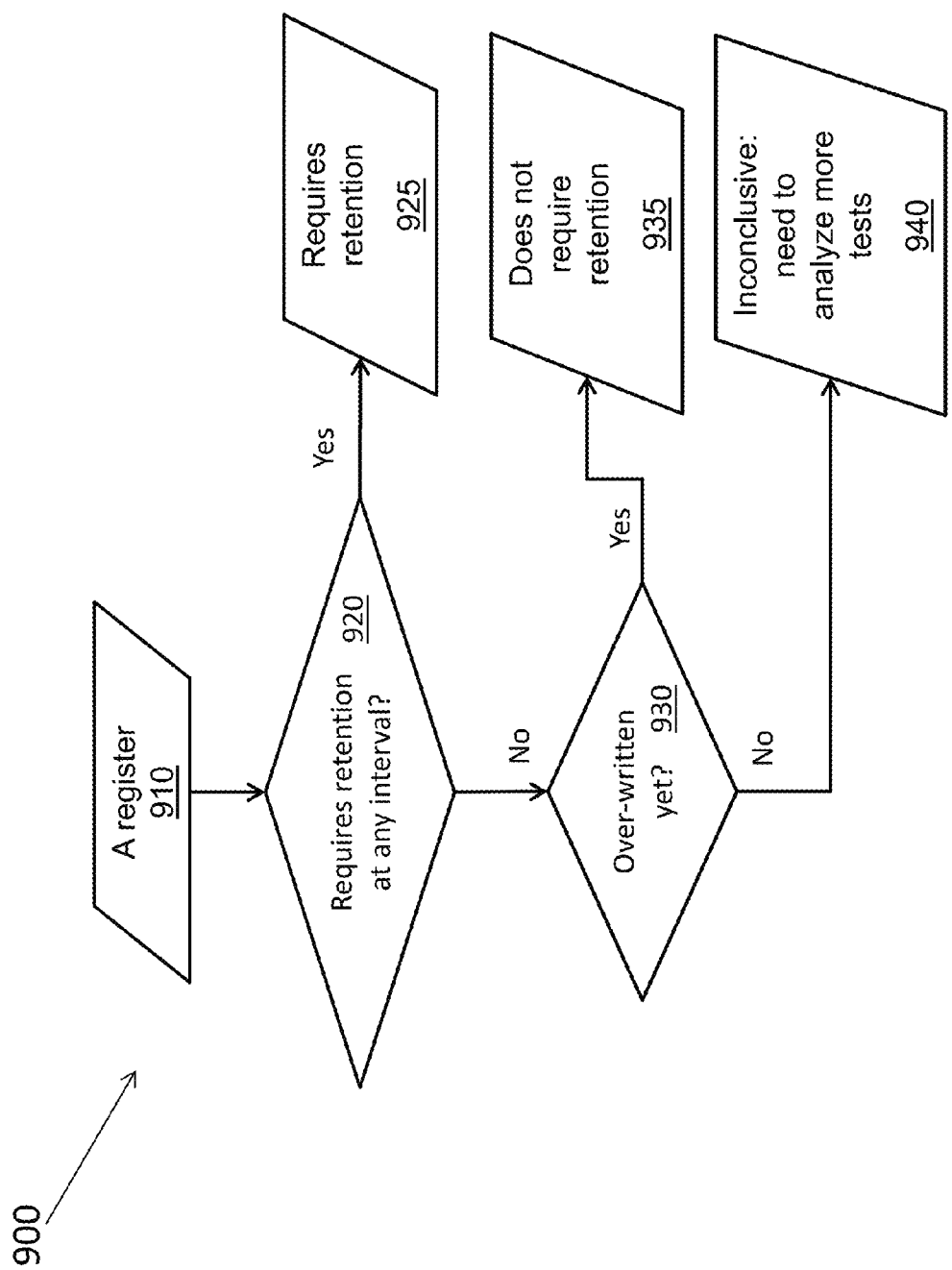
FIG. 9 is a flow chart of a procedure for determining non-retention status of a register at the final state of a simulation sequence, according to an embodiment.

Finally in temporal partitioning, at the end of the sequence where all intervals are analyzed, report retention status for a register using the following criteria, as shown in the flow chart of FIG. 9 for how to determine non-retention status at the final state of a sequence: at step 920, a register requires retention (925) if it requires retention in any interval. If not, and if the register has been over-written at step 930, the register does not need retention 935. Otherwise, the status of the register is inconclusive (940).

Temporal partitioning effectively produces results because the end state is verified at each interval. Therefore, the state at the beginning of each interval will be identical to an interval as if all of the data had been retained. Since one register is removed from the non-retention candidate list when it is over-written, it is possible to ensure that all of the analysis results are based on the initial state of the first interval.

Analyzing Multiple Sequences

Figure 10:
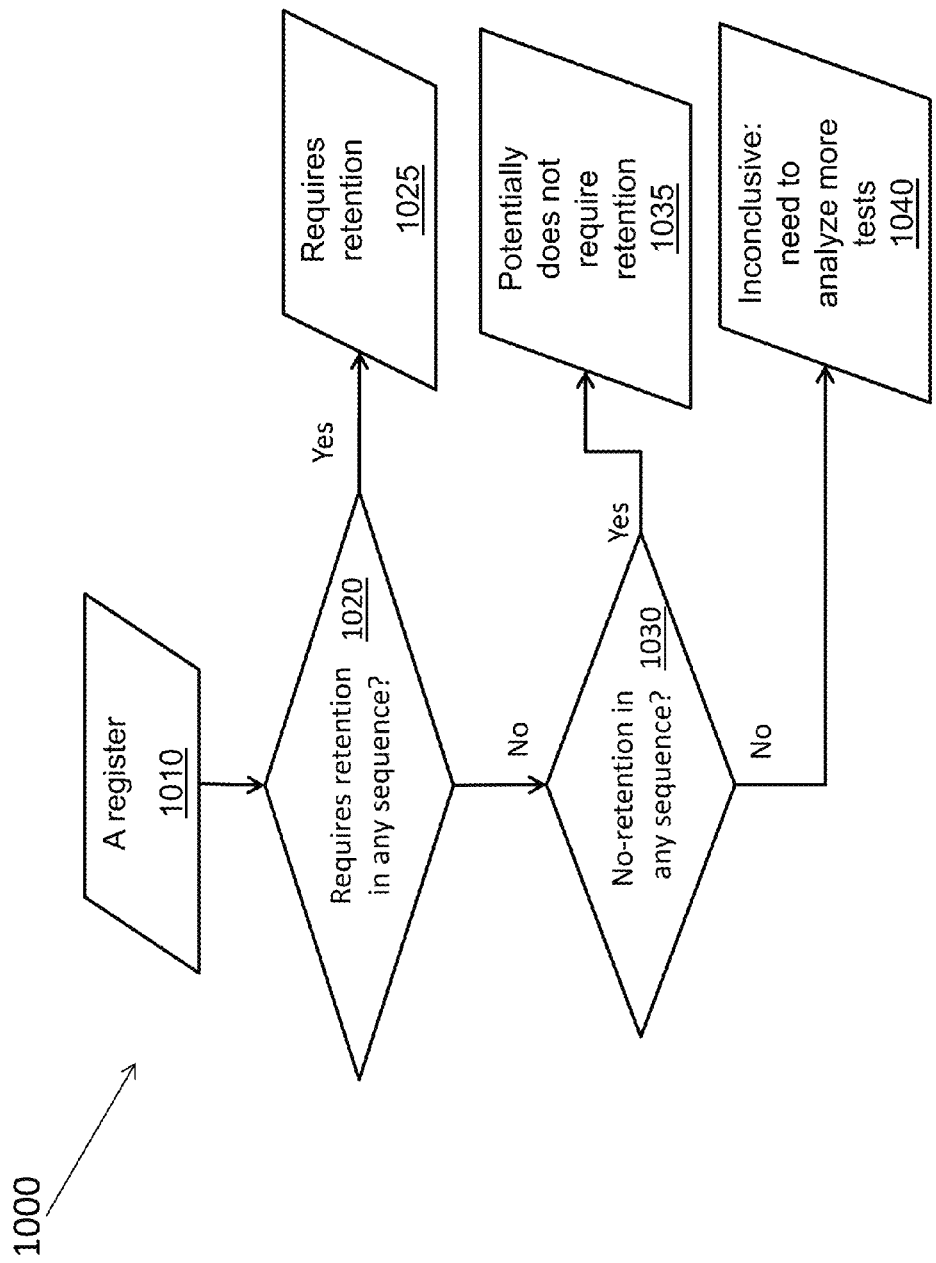
FIG. 10 is a flow chart of a procedure for determining non-retention status of a register after analyzing all sequences of a desired set of sequences, according to an embodiment.

The retention status of a register is determined by the retention synthesis based on the given sequence. To more fully exercise a chip so that the retention status of more registers can be determined, multiple sequences typically need to be analyzed. The final status of a register is then determined using the following procedure for determining non-retention status after analyzing all given sequences, as shown in FIG. 10. The procedure 1000 commences with a register at 1010. If the register requires retention in any sequence at 1020, then the register is determined to require retention 1025. Otherwise, if the register is non-retention in any sequence at 1030, then the register is potentially non-retention 1035. If a register is inconclusive in all sequences at 1030, then the register is still determined to be inconclusive 1040. When the register is inconclusive, more sequences need to be analyzed to determine if it is a retention register or a non-retention register.

In accordance with the embodiments herein, the retention synthesis has been described as generally applicable to a fixed sequence that is being analyzed. However, sometimes values in certain variables in the sequence may vary during runtime. For example, the control signals in the sequence may always be the same but the data portion may vary. To handle this type of sequences, the inputs can have different values called "symbol injectors". Whenever an input can have an arbitrary value, a symbol is injected into the input. In this manner, the presented algorithm can take those symbols into consideration, and the found non-retention registers will still be correct.

The above means for analyzing a circuit design, functional test sequences, and the associated power specification to identify registers that do not need retention when a block is powered down have clear advantages including more cost-effective circuits, as well as other advantages apparent to those skilled in the art. Reducing the number of retention registers reduces power consumption and overall chip area.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while one retention synthesis example is shown for illustrative purposes, any design can be employed in accordance with the teachings herein. Moreover, while particular arrangements of applications, computers, simulators, and other simulation environment elements are shown, the arrangements are highly variable and can be all disposed within a single server or computing device, or the applications can be spread over a variety of servers as appropriate and within ordinary skill. Also, where a "mean" is referenced it should be taken to include a particular functional component/process/processor described herein, or various combinations (all or part of) a plurality of components/processes/processors described herein. Accordingly, this description is meant to be taken only by way of example, and not to otherwise limit the scope of this invention.

What is claimed is:

1. A method for identifying retention status of registers of a circuit, the method comprising the steps of:
    performing symbolic simulation for one or more simulation cycles starting at the beginning of the one or more simulation cycles;
    replacing each register value with a multiplexer, a select of the multiplexer equal to 0 connecting to the register value and another input of the multiplexer connects to a symbol;
    collecting a first symbolic trace at an output and building a first miter with a logic value of the first symbolic trace;
    collecting a second symbolic trace in design registers and building a second miter with a logic value of each register value;
    producing a Boolean function by implementing an OR logic gate, using a processor, that ORs the output of the first miter and the output of the second miter, if the output is 0 the circuit behavior has not changed, thereby identifying a non-retention register, and if the output is 1, the circuit behavior has changed, thereby identifying a retention register; and
    determining a set of non-retention registers that allow the output to remain 0.

2. The method of claim 1 wherein the step of determining registers that allow the output to remain 0 comprises the steps of:
- creating an empty set of non-retaining registers;
- choosing one select line of the multiplexer of the Boolean function to be 1 and solve an output;
- adding the select line of the multiplexer to the set of non-retaining registers if the output of the Boolean function is 0;
- repeating the step of choosing one select line until all select lines of all multiplexers of the Boolean function have been chosen;
- adding select lines not in support of the Boolean function to the set of non-retaining registers;
- providing a final list of registers that correspond to the select lines in the set of non-retaining registers at the end of the analysis.

3. The method of claim 1 further comprising a method for determining non-retention candidates for a next interval, through temporal partitioning, comprising the steps of:
- verifying that a register has not required retention at previous interval and if it does require retention at the previous interval, it is not a non-retention candidate;
- determining, if the register has not required retention at the previous interval, whether the register is over-written yet, and if (a) it is over-written yet, it is not a non-retention candidate for the next interval and if (b) it is not overwritten-yet, it is a non-retention candidate for the next interval.

4. The method of claim 1 further comprising a method for determining non-retention status at an end of a sequence during simulation, as part of temporal partitioning, comprising the steps of:
- determining if the register requires retention in any interval, and if (a) yes then the register needs retention, and if (b) no and the register has been over-written, then the register does not need retention, and if (c) no and the register has not been over-written yet, then the register's status is inconclusive; and
- determining a retention status of the register at the final state to identify registers that require retention and registers that can be non-retention.

5. The method of claim 1 further comprising a method for determining non-retention status after analyzing all sequences, comprising the steps of:
- verifying that a register has not required retention in any sequence and, if the register has required retention in any sequence then the register requires retention;
- determining if there is non-retention in any sequence and (a) if there is no-retention in any sequence, then the register potentially does not require retention and (b) if there is not no-retention in any sequence, then the non-retention status is inconclusive and more tests need to be analyzed.

6. The method of claim 1 wherein a processor is configured to carry out the method steps.

7. A system for identifying retention status of registers of a circuit, the system comprising:
- means for performing symbolic simulation for one or more simulation cycles starting at the beginning of the one or more simulation cycles;
- means for replacing each register value with a multiplexer, a select of the multiplexer equal to 0 connecting to the register value and another input of the multiplexer connects to a symbol;
- means for collecting a first symbolic trace at an output and building a first miter with a logic value of the first symbolic trace;
- means for collecting a second symbolic trace in design registers and building a second miter with a logic value of each register value;
- means for producing a Boolean function by implementing an OR logic gate, using a processor, that ORs the output of the first miter and the output of the second miter, if the output is 0, the circuit behavior has not changed, thereby identifying a non-retention register, and if the output is 1, the circuit behavior has changed thereby identifying a retention register; and
- means for determining a set of non-retention registers that allow the output to remain 0.

8. The system of claim 7 wherein the means for determining registers that allow the output to remain 0 comprises:
- means for creating an empty set of non-retaining registers;
- means for choosing one select line of the multiplexer of the Boolean function to be 1 and solve an output;
- means for adding the select line of the multiplexer to the set of non-retaining registers if the output of the Boolean function is 0;
- means for repeating the step of choosing one select line until all select lines of all multiplexers of the Boolean function have been chosen;
- means for adding select lines not in support of the Boolean function to the set of non-retaining registers;
- means for providing a final list of registers that correspond to the select lines in the set of non-retaining registers at the end of the analysis.

9. The system of claim 7 further comprising a system for determining non-retention candidates for a next interval, through temporal partitioning:
- means for verifying that a register has not required retention at previous interval and if it does require retention at the previous interval, it is not a non-retention candidate; and
- means for determining, if the register has not required retention at the previous interval, whether the register is over-written yet, and if (a) it is over-written yet, it is not a non-retention candidate for the next interval and if (b) it is not overwritten-yet, it is a non-retention candidate for the next interval.

10. The system of claim 7 further comprising a method for determining non-retention status at an end of a sequence during simulation, as part of temporal partitioning, comprising:
- means for determining if the register requires retention in any interval, and if (a) yes then the register needs retention, and if (b) no and the register has been over-written, then the register does not need retention, and if (c) no and the register has not been over-written yet, then the register's status is inconclusive; and
- means for determining a retention status of the register at the final state to identify registers that require retention and registers that can be non-retention.

11. The system of claim 7 further comprising a system for determining non-retention status after analyzing all sequences, comprising:
- means for verifying that a register has not required retention in any sequence and, if the register has required retention in any sequence then the register requires retention; and means for determining if there is non-retention in any sequence and (a) if there is no-retention in any sequence, then the register potentially does not require retention and (b) if there is not no-retention in any sequence, then the non-retention status is inconclusive and more tests need to be analyzed.

* * * * *